(12) United States Patent
Hacigumus et al.

(10) Patent No.: US 7,685,437 B2
(45) Date of Patent: Mar. 23, 2010

(54) QUERY OPTIMIZATION IN ENCRYPTED DATABASE SYSTEMS

(75) Inventors: Vahit Hakan Hacigumus, San Jose, CA (US); Balakrishna Raghavendra Iyer, San Jose, CA (US); Sharad Mehrotra, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 1456 days.

(21) Appl. No.: 10/807,662

(22) Filed: Mar. 24, 2004

(65) Prior Publication Data

US 2004/0243799 A1 Dec. 2, 2004

Related U.S. Application Data

(63) Continuation-in-part of application No. 10/449,421, filed on May 30, 2003, now Pat. No. 7,500,111.

(51) Int. Cl.
*G06F 11/30* (2006.01)
*G06F 17/30* (2006.01)
*H04L 9/00* (2006.01)

(52) U.S. Cl. ............... 713/193; 713/189; 707/9; 707/10; 707/101; 726/26

(58) Field of Classification Search ............ 713/189, 713/193, 190; 707/9, 10, 101, 1, 3, 4; 726/26, 726/27
See application file for complete search history.

(56) References Cited

U.S. PATENT DOCUMENTS

| | | | |
|---|---|---|---|
| 5,442,699 A | 8/1995 | Arnold et al. | |
| 5,713,018 A * | 1/1998 | Chan | 707/10 |
| 5,822,751 A | 10/1998 | Gray et al. | |
| 5,963,642 A * | 10/1999 | Goldstein | 713/193 |
| 6,226,629 B1 | 5/2001 | Cossock | |
| 6,275,824 B1 | 8/2001 | O'Flaherty et al. | |
| 6,275,939 B1 * | 8/2001 | Garrison | 726/6 |
| 6,446,092 B1 | 9/2002 | Sutter | |
| 6,785,810 B1 * | 8/2004 | Lirov et al. | 713/165 |
| 6,792,425 B2 * | 9/2004 | Yagawa et al. | 707/10 |
| 6,957,341 B2 * | 10/2005 | Rice et al. | 713/190 |
| 7,228,416 B2 * | 6/2007 | Nishizawa et al. | 713/168 |

(Continued)

FOREIGN PATENT DOCUMENTS

EP  855656 A2 *  7/1998

OTHER PUBLICATIONS

N. Ahituv et al., "Processing Encrypted Data", *Communications of the ACM*, 30(9) pp. 777-780, 1987.

(Continued)

*Primary Examiner*—Zachary A Davis
(74) *Attorney, Agent, or Firm*—Gates & Cooper LLP

(57) ABSTRACT

A client-server relational database system includes a client computer connected to a server computer via a network. Data from the client computer is encrypted by the client computer and hosted by the server computer. The encrypted data is operated upon by the server computer to produce an intermediate results set. The intermediate results set is sent from the server computer to the client computer where it is operated upon by the client computer and then returned to the server computer where it is further operated upon by the server computer before being sent again from the server computer to the client computer in order to produce actual results.

40 Claims, 10 Drawing Sheets

U.S. PATENT DOCUMENTS

| | | | |
|---|---|---|---|
| 7,266,699 B2* | 9/2007 | Newman et al. | 713/182 |
| 7,500,111 B2* | 3/2009 | Hacigumus et al. | 713/193 |
| 2001/0019614 A1 | 9/2001 | Madoukh | |
| 2002/0038421 A1 | 3/2002 | Hamada | |
| 2002/0129260 A1 | 9/2002 | Benfield et al. | |
| 2002/0174355 A1 | 11/2002 | Rajasekaran et al. | |
| 2003/0055824 A1 | 3/2003 | Califano | |
| 2003/0061205 A1 | 3/2003 | Cleghorn et al. | |
| 2003/0123671 A1 | 7/2003 | He et al. | |
| 2004/0181679 A1 | 9/2004 | Dettinger et al. | |
| 2005/0044366 A1* | 2/2005 | Pucheral et al. | 713/172 |

OTHER PUBLICATIONS

E. Brickell et al., "On Privacy Homomorphisms", *In Proc. Advances in Cryptology-Eurocrypt* '87, pp. 117-125, 1988.

S. Chaudhuri, "An Overview of Query Optimization in Relational Systems", *In Proc. of ACM Symposium on Principles of Database Systems (PODS)*, pp. 34-43, 1998.

S. Chaudhuri et al., "Including Group-By in Query Optimization", *In Proc. of VLDB*, pp. 354-366, 1994.

R. Power, Computer Security Institute, "Computer Security Issues & Trends: 2002 CSI/FBI Computer Crime and Security Survey" 8(1) pp. http://www.gocsi.com, 2002.

ComputerWorld, "J.P. Morgan signs outsourcing deal with IBM", 3pp. Dec. 30, 2002.

ComputerWorld, "Business Process Outsourcing", 4pp., Jan. 01, 2001.

U. Dayal, "Of nests and trees: A unified approach to processing queries that contain nested subqueries, aggregates, and quantifiers", *In Proc. of VLDB*, pp. 197-208, 1987.

J. Domingo-Ferrer, "A new privacy homomorphism and applications", *Information Processing Letters*, 60(5):277-282, 1996 [7pp including cover/publication page].

J. Domingo-Ferrer, "Multi-applications smart cards and encrypted data processing", Future Generation Computer Systems, 13:65-74, 1997, [preprint: Nov. 28, 1996 pp. 1-16].

C. A. Galindo-Legaria et al., "Orthogonal optimization of subqueries and aggregation", *In Proc. of ACM SIGMOD*, pp. 369-374, 2001.

H. Garcia-Molina et al., "Database Systems: The Complete Book" Prentice Hall, pp. 369-374, 2002.

G. Graefe et al., "The EXODUS optimizer generator", *In Proc. of ACM SIGMOD*, pp. 160-172, 1987.

H. Hacigumus et al., "Executing SQL over Encrypted Data in Database Service Provider Model", *In Proc. of ACM SIGMOD*, pp. 216-227, 2002.

H. Hacigumus et al., "Providing Database as a Service", *In Proc. of ICDE*, 10pp., 2002.

W. Kim, "On optimizing an SQL-like nested query", *ACM Transactions on Database Systems (TODS)*, 7(3):443-469, 1982.

M. Muralikrishna, "Optimization and dataflow algorithms for nested tree queries", *In Proc. of VLDB*, pp. 77-85, 1989.

R. L. Rivest et al., "On Data Banks and Privacy Homomorphisms", *In Foundations of Secure Computation*, pp. 169-177, 1978.

D. R. Stinson, "Cryptography: Theory and Practice", CRC Press, pp. 114-125 (plus title/publication page), 1995.

TPC-H. Benchmark Specification, Revision 2.1.0, http://www.tpc.org/tech, pp. 1-145, 1993.

P. Wayner, "Translucent Databases", Flyzone Press, 10pp, 2002.

N. R. Wagner, et al., "Encrypted Database Design: Specialized Approaches," IEEE, pp. 148-153, 1986.

Adam, N.R., "Security-Control Methods for Statistical Databases: A Comparative Study", ACM Computing Surveys, vol. 21., No. 4, pp. 515-556, Dec. 1989.

Agrawal, R., et. al., "Watermarking Relational Databases", Proc. Of the 28th VLDB Conference, Hong Kong, China, 2002.

Agrawal, R., et. al., "Hippocratic Databases" , Proc. Of the 28th VLDB Conference, Hong Kong, China, 2002.

Bouganim, L., et al., "Chip-Secured Data Access: Confidential Data on Untrusted Servers" Proc. Of the 28th VLDB Conference, Hong Kong, China, 2002.

Buell, D. A., et al., "A Multiprecise Integer Arithmetic Package", The Journal of Supercomputing 3, pp. 89-107, Kluwer Academic Publishers, Mar. 1989.

Cho, J. "A Fast Regular Expression Indexing Engine", Proc. Of International Conference on Data Engineering, 2002, pp. 1-12.

Digital Bibliography & Library Project. http://dblp.uni-trier.de/. , May 24, 2004.

Federal Information Processing Standards Publication, "Announcing the Advanced Encryption Standard (AES)", Publication 197, pp. 1-47, Nov. 26, 2001.

Federal Information Processing Standards Publication, "Data Encryption Standard (DES)", Publication 46-3, pp. 1-22, Oct. 25, 1999.

Gaines, H., "Cryptanalysis; a study of ciphers and their solutions" Dover 1956, http://wwwmath.cudenver.edu/~wcherowi/courses/m5410/engstat.html.

Granlund, T., "GNU MP, The GNU Multiple Precision Arithmetic Library" TMG Datakonsult, Edition 2.0.2, pp. 1-41, Jun. 1996.

Hacigumus, H., et al., "Encrypted Database Integrity in the Database Service Provider Model," In Proc. of International Workshop on Certification and Security in E-Services (CSES'02), IFIP WCC, 2002.

He, J., et al., "Cryptography and relational database management systems" In Proc. of International Database Engineering & Applications Symposium, 2001.

Ioannidis, Y.E., et al., "Histogram-Based Approximation of Set-Valued Query Answers" Proc. Of the 25th VLDB Conference Edinburgh, Scotland, pp. 174-185, 1999.

ISO/IEC, "Information Technology— Database Language SQL (Proposed revised text of DIS 9075)" Jul. 30, 1992.

Jagadish, H.V., et al., "Global Optimization of Histograms" ACM SIGMOND, Santa Barbara, California, May 21-24, 2001.

Menezes, A.J., et al., Handbook of Applied Cryptography, p. 41-45, CRC Press 1997.

Piatetsky-Shapiro, G., et al., "Accurate Estimation of the Number of Tuples Satisfying a Condition" ACM, pp. 256-276, 1984.

Rivest, R.L., et al., "A Method for Obtaining Digital Signatures and Public-Key Cryptosystems", Communications of ACM, 21(2), pp. 1-15, 1978.

Schneier, B., "Description of a New Variable-Length Key, 64-Bit Block Cipher (Blowfish)", Fast Software Encryption, Cambridge Security Workshop Proceedings, Springer-Verlag, pp. 191-204, 1994.

Serpette, B., "BigNum: a portable and efficient package for arbitrary-precision arithmetic," Technical Report 2, Digital Equipment Corporation and INRIA, pp. 1-29, 1989.

Shand, M., et al., "Hardware speedups in long integer multiplication" In Proc. of ACM Symposium on Parallel Algorithms and Architectures, pp. 138-145, 1990.

Silberschatz, A., et al., "Database System Concepts", Third Edition, WCB McGraw-Hill, pp. 418-426, 1997.

Song, D.X., et al., "Practical Techniques for Searches on Encrypted Data", In Proc. IEEE, pp. 44-56, 2000.

Traub, J.F., et al., "The statistical security of a statistical database," ACM Transactions on Database Systems (TODS), vol. 9, No. 4, pp. 672-679, 1984.

Vulliemin, J. et al., "Programmable active memories: Reconfigurable systems come of age," IEEE Transactions on VLSI Systems, vol. 4, Issue 1, pp. 56-69, 1996.

Winslett, M. "Jeffrey D. Ullman Speaks Out on the Future of Higher Educaiton Startups, Database Theory, and More" Sigmond Record, vol. 30, No. 3, 2001.

Hacigumus et al., "Query Optimization in Encrypted Database Systems," Proceedings of 10th Database Systems for Advanced Applications Conference, Apr. 2005, pp. 43-55.

* cited by examiner

QUERY OPTIMIZATION IN ENCRYPTED DATABASE SYSTEMS

CROSS-REFERENCE TO RELATED APPLICATION

This application is a continuation-in-part under 35 U.S.C. §120 of commonly-assigned U.S. Utility application Ser. No. 10/449,421, entitled "QUERYING ENCRYPTED DATA IN A RELATIONAL DATABASE SYSTEM," filed on May 30, 2003 now U.S. Pat. No. 7,500,111, by Vahit H. Hacigumus, Balakrishna R. Iyer, and Sharad Mehrotra, which application is incorporated by reference herein.

BACKGROUND OF THE INVENTION

1. Field of the Invention

This invention relates in general to database management systems performed by computers, and in particular, to query optimization in encrypted database systems.

2. Description of Related Art (Note: This application references a number of different publications, as indicated throughout the specification by one or more reference numbers. A list of these different publications ordered according to these reference numbers can be found below in the section entitled "References." Each of these publications is incorporated by reference herein.)

The widespread deployment and adoption of broadband communications, the resulting glut in bandwidth, and advances in networking have caused a generational shift in computing. The emerging grid infrastructure harnesses available computing and storage at disparate heterogeneous machines into a shared network resource. There is an ongoing consolidation that results in the application service provider (ASP) model. Organizations outsource some of their core information technology (IT) operations (e.g., data centers) to specialized service providers over the Internet [7, 6]. Many organizations and users will be storing their data and processing their applications at remote, potentially untrusted, computers. One of the primary concerns is that of data privacy—protecting data from those who do not need to know.

There are two kinds of threats to privacy. Outsider threats from hackers and insider threats from, perhaps, disgruntled employees. Encrypting stored data [15] is one way to address outsider threats. Data is only decrypted on the server before computation is applied and re-encrypted thereafter. Encryption and decryption performance is a problem that can be addressed by hardware and by applying techniques to minimize decryption.

Insider threats are more difficult to protect against. Recent studies indicate that a significant fraction of data theft is perpetrated by insiders [5]. For example, how would one protect the privacy of data from the data base system administrator who probably has superuser access privileges?

If the end user (end user and client are used interchangeably herein) is on a secure environment, then one way to solve the insider threat problem is to store all data encrypted on the server and make it impossible to decrypt on the server (for example, only the end user is made aware of decryption keys). In this model, we assume computation against data stored at the server is initiated by the end user. Moreover, assume that it is possible to transform and split the computation into two parts: a server part of the computation is sent to the server to execute directly against encrypted data giving encrypted results, which are shipped to the client, which decrypts and performs a client part of the computation. This scheme, under appropriate conditions, addresses the problem of insider threats. The difficulty is that there is no know way to split general computations as required. However, an interesting subset of SQL techniques necessary for such computational transformations have been found [14]. An algebraic framework has also be shown in which these techniques may be applied. However, the problem of how to put these techniques together in an optimum manner has not been addressed.

There are six concepts needed to address the query optimization problem, as described in this application: 1) data level partitioning to improve the query partitioning schemes presented by previous work, 2) a novel operator that sends data in a round trip from the server to the client and back for evaluating logical comparisons as in sorting, 3) operator level partitioning to distribute the query processing tasks between the client and the server, 4) transformation rules that are required to generate alternate query execution plans in the optimizer 5) query plan enumeration to choose the best query execution plan, and 6) an enhanced storage model that is flexible enough to satisfy different performance and privacy requirements for different systems and applications. Each is explained and described in this application. By means of an example, it is shown that significant performance improvements are possible from application of the techniques in this application.

SUMMARY OF THE INVENTION

To overcome the limitations in the prior art described above, and to overcome other limitations that will become apparent upon reading and understanding the present specification, the present invention discloses a client-server relational database system having a client computer connected to a server computer via a network, wherein data from the client computer is encrypted by the client computer and hosted by the server computer, the encrypted data is operated upon by the server computer to produce an intermediate results set, the intermediate results set is sent from the server computer to the client computer where it is operated upon by the client computer and then returned to the server computer where it is further operated upon by the server computer before being sent again from the server computer to the client computer in order to produce actual results.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

1. Overview

The commoditization of networking has enabled cost effective distribution of computing, while at the same time increasing the need to protect oneself from malicious computing (e.g., viruses and attacks). Electronic privacy protection has emerged as a new requirement. If data could be encrypted and whatever computing that needs to be applied to the data could be transformed and split into two, a first portion applicable directly to the encrypted data giving encrypted results, and a second portion applicable to the encrypted results to give the same answer as applying the original logic on unencrypted data, then many of the privacy requirements could be addressed. However, it is not known how to apply general logic to encrypted data, in this fashion. We know how to apply interesting subsets of logic, and the subset of SQL logic where this model is applicable is our focus. Prior work has given techniques to be used for this purpose, but the problem of how to put these techniques together in an optimum manner has not been addressed. This application models and solves that optimization problem by 1) distinguishing data and operator level partitioning functions, 2) giving new query transformation rules, introducing a "round trip" server-to-client-to-server operator, and 3) a novel query plan enumeration algorithm. By means of an example, it is shown that significant performance improvements are possible from application of the techniques in this application.

2. System Description

Figure 1:
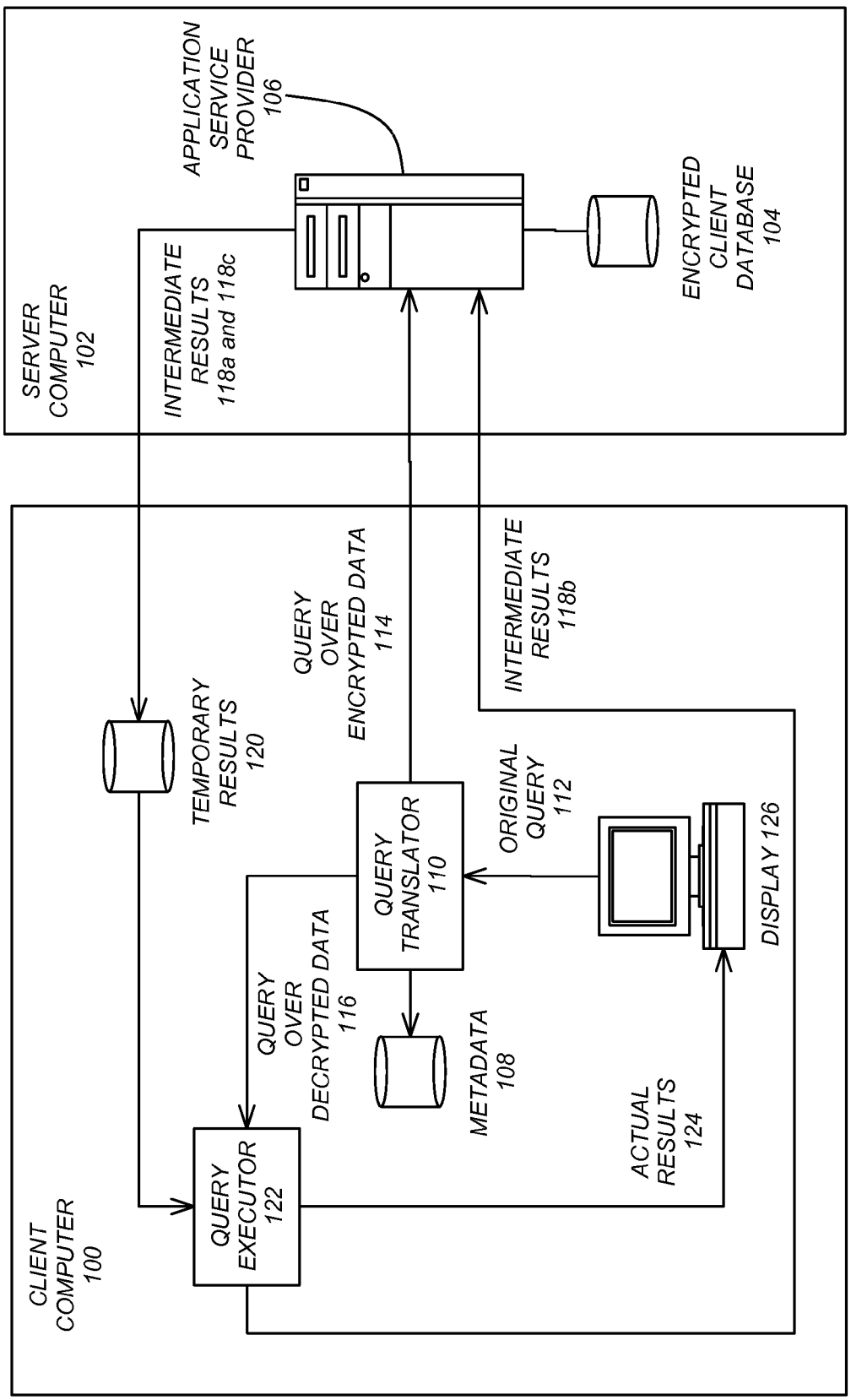
FIG. 1 is block diagram that illustrates the basic architecture and control flow of the preferred embodiment of the present invention.

FIG. 1 is block diagram that illustrates the basic architecture and control flow of the preferred embodiment of the present invention. This architecture is known as the "database as a service" (DAS) model, which involves trusted clients and an untrusted server.

In this illustration, there are three fundamental entities. A client computer 100 encrypts data and stores the encrypted data at a server computer 102 in an encrypted client database 104 managed by an application service provider 106. The encrypted client database 104 is augmented with additional information (which we call the index) that allows certain amount of query processing to occur at the server computer 102 without jeopardizing data privacy. The client computer 100 also maintains metadata 108 which is used by a query translator 110 for translating the user query 112 into different portions, i.e., a query over encrypted data 114, for execution on the server computer 102, and a query over decrypted data 116, for execution on the client computer 100. The server computer 102 generates an encrypted intermediate results set 118a, which is transferred to the client computer 100 and stored as temporary results 120. The client computer 100 includes a query executor 122 that decrypts the temporary results 120 and performs the query over decrypted data 116, which may include a filtering or sorting operation, to generate an updated intermediate results set 118b, which is then re-encrypted and transferred back to the server computer 102. The server computer 102 completes its query processing on the re-encrypted intermediate results set 118b, in order to generate a new intermediate results set 118c, which is provided to the client computer 100 and stored as temporary results 120. Finally, the query executor 122 in the client computer 100 decrypts the temporary results 120 and performs the query over decrypted data 116 in order to generate actual final results 124, i.e., an answer to the query, for display 126 to the user.

In this environment, the client computer 100 maintains the needed encryption key(s), and the data is encrypted by the client computer 100 before it is sent to the server computer 102 for inclusion in the encrypted client database 104. Consequently, the data is always encrypted when it is stored on or processed by the server computer 102. Moreover, at no time are the encryption keys given to the server computer 102, and thus the data can never be decrypted by the server computer 102.

2.1. Storage Model

In this section, we formally specify how relational data is stored at the server computer 102. The storage model presented here substantially enhances the one presented in [14]. This storage model includes various types of attributes to efficiently satisfy different performance and privacy requirements imposed by specific applications.

Let R be a relation with the set of attributes $\tilde{R}=\{r_1, \ldots, r_n\}$. R is represented at the server computer 102 as an encrypted relation $R^S$ that contains an attribute etuple=$\langle\epsilon'(r_1, r_2, \ldots, r_n)\rangle$, where $\epsilon'$ is the function used to encrypt a row of the relation R. $R^S$ also (optionally) stores other attributes based on the following classification of the attributes of R.

Table 1 is an example of a relation where each row comprises a tuple and each column comprises an attribute:

TABLE 1

| Relation employee | | | | |
| --- | --- | --- | --- | --- |
| eid | ename | salary | city | did |
| 23 | Tom | 70K | Maple | 10 |
| 860 | Mary | 60K | Maple | 55 |
| 320 | John | 23K | River | 35 |
| 875 | Jerry | 45K | Maple | 58 |
| 870 | John | 50K | Maple | 10 |
| 200 | Sarah | 55K | River | 10 |

Field level encrypted attributes ($F_k \in \tilde{R}:1 \leq k \leq k' \leq n$): are attributes in R on which equality selections, equijoins, and grouping might be performed. For each $F_k$, $R^S$ contains an attribute $F_k^f = \epsilon^f(F_k)$, where $\epsilon^f$ is a deterministic encryption algorithm, $A_i = A_j \Leftrightarrow \epsilon_k(A_i) = \epsilon_k(A_j)$, and $\epsilon_k$ is a deterministic encryption algorithm with key k that is used to encode the value of the field $F_k$.

Partitioning attributes ($P_m \in \tilde{R}:1 \leq m \leq m' \leq n$): are attributes of R on which general selections and/or joins (other than equality) might be performed. For each $P_m$, $R^S$ contains an attribute $P_m^{id}$ that stores the partition index of the base attribute values.

Partition indexes are coarser representation of original attribute values. The value domain of an attribute is divided into partitions, and an id, which is called an index value, is assigned for each partition. Each value is mapped into an index value. Original query conditions are translated using partition indexes and those translated conditions are evaluated directly over encrypted tuples. Query processing is finalized after decrypting the results returned by the translated query. Details of the use of partition indexes in SQL query processing can be found in [14].

Aggregation attributes ($A_j \in \tilde{R}: 1 \leq j \leq j' \leq n$): are attributes of R on which we expect to perform aggregation. We use a special kind of encryption algorithm to encrypt those attributes. Specifically, we need encryption algorithms that allow basic arithmetic operations directly over encrypted data.

Privacy Homomorphisms (PHs for short) are such encryption algorithms. PHs were first introduced by Rivest et al [18]. A security analysis of PHs presented by Rivest are fully studied in [1, 2]. Enhanced PH schemes are proposed by Ferrer in [9, 10]. For the benefit of the reader, we give a definition of a specific PH and an example, which illustrates how PH works, in commonly-assigned U.S. Utility application Ser. No. 10/449,421, entitled "QUERYING ENCRYPTED DATA IN A RELATIONAL DATABASE SYSTEM," filed on May 30, 2003, by Vahit H. Hacigumus, Balakrishna R. Iyer, and Sharad Mehrotra, which application is incorporated by reference herein.

In the storage model, for each $A_j$, $R^S$ contains an attribute $A_j^h$ that represents the encrypted form of corresponding original attribute $A_j$ with PH, thus $$A_j^h = \epsilon^{PH}(A_j)$$

where $\epsilon^{PH}$ is a PH.

Embedded attributes ($E_l \in \tilde{R}: 1 \leq l \leq l' \leq n$): are attributes in $\tilde{R}$ that are not in any of the above four categories. These attributes are, most likely, not accessed individually by queries for either selections, group creation, or aggregation. They need not be encrypted separately. Their values can be recovered after the decryption operation on the encrypted row (i.e., etuple) is executed on the client computer 100.

Given the above attribute classification, the schema for the relation $R^S$ is as follows:

$$R^S(\text{etuple}, F_1^f, \ldots, F_k^f, P_1^{id}, \ldots, P_m^{id}, A_1^h, \ldots, A_j^h)$$

Table 2 shows a possible instance of the server-side representation of the employee relation given in Table 1:

In the mapping, we assumed that partitioning attributes are {eid, salary, city, did}, field level encrypted attributes are {city, did}, and aggregation attributes are {salary}.

Note that, for a relation, the categories may overlap. For example, if an attribute is expected to be used for both selection and aggregation, we might represent it as both an aggregation and partitioning attribute. Similarly, an attribute may be represented both as a partitioning attribute and a field-level encrypted attribute, wherein the latter will facilitate efficient evaluation of equi-join or equality selection queries and the former will support other general queries. This allows flexibility to the model and enables customization of the system for specific performance, security, and storage requirements.

3. Query Processing Over Encrypted Data

Given a query Q, our purpose is to define how the query can be securely evaluated in an encrypted database environment where the client computer 100 is the owner of the data and the server computer 102 hosts the data in encrypted form without having the authority to decrypt that data at any time. An operator tree representation of a given query has been studied in literature previously, as in [13, 3], including nested query structures [11].

We partition a given query tree into two parts: $Q^S$ and $Q^C$, where $Q^S$ executes at the server computer 102 and $Q^C$ executes at the client computer 100. Since decryption is not allowed at the server computer 102, as a privacy requirement, $Q^S$ executes over the encrypted representation directly. One way to partition query processing in this case is to store the encrypted tables at the server computer 102 and to transfer them whenever they are needed for query processing to the client computer 100. Then, the client computer 100 could decrypt the tables and evaluate the rest of the query.

Although this model would work, it pushes almost the whole of the query processing to the client computer 100 and does not allow the client computer 100 to exploit resources available at the server computer 102. In computing models, such as database-as-a-service (DAS) [15, 14], the goal of the partitioning is to minimize the work done by $Q^C$ since client computers 100 may have limited storage and computational resources and they rely on server computers 102 for the bulk of the computation.

Therefore, the partitioning and query processing strategy used in this application generalizes the approach proposed in along two important directions. First, $Q^S$ executes over the encrypted representation directly generating a possible superset of results. Second, the results of $Q^S$ are decrypted and further processed by the client computer 100 using $Q^C$ to

TABLE 2

Relation employee$^S$: encrypted version of relation employee

| etuple (encrypted tuple) | eid$^{id}$ | salary$^{id}$ | city$^{id}$ | did$^{id}$ | city$^f$ | did$^f$ | salary$^h$ | |
|---|---|---|---|---|---|---|---|---|
| | | | | | | | salary$^h_p$ | salary$^h_g$ |
| =*?Ew@R*(ii-+,-... | 2 | 81 | 18 | 2 | ?Ew... | @R*... | 7 | 27 |
| b*((i i(*?Ew@=l,r... | 4 | 81 | 18 | 3 | ?Ew... | =+,... | 18 | 17 |
| w@=W*((iii(*?E:,j... | 7 | 59 | 22 | 4 | i(*... | i(*... | 2 | 23 |
| @=W*((i?E;,r . . . | 4 | 49 | 18 | 3 | ?Ew... | | 3 | 2 |
| *(i(* @=U(iS?/,6... | 4 | 49 | 18 | 2 | ?Ew... | @R*... | 8 | 7 |
| ffTi* @=U(i?G+,a... | 7 | 49 | 22 | 2 | i(*... | | 13 | 12 | generate the answer to Q. We refer to the above partitioning of Q into $Q^S$ and $Q^C$ as operator level partitioning.

Our focus in this application is how to partition a given query tree in a way that maximizes the benefit of the client computer 100 based on system specific criteria. We formulate this concern as an optimization problem. In our system, the client computer 100 is responsible for generating partitioned query execution plans. Consequently, the client computer 100 performs the optimization process based on the statistics and metadata information maintained at the client computer 100. Once the server-side and client-side queries are identified, they are subject to traditional query optimization at the server computer 102 and at the client computer 100, respectively.

The first generalization of the query processing strategy in [14] we consider is a data-induced partitioning of the server-side query $Q^S$. Since data is represented using a coarse representation via partition indices, a condition in Q is translated into a corresponding condition over the partition indices in $Q^S$, which may produce a superset of the tuples that satisfy Q. Tuples that satisfy conditions in $Q^S$ can be classified into two: those that certainly satisfy and those that may satisfy the original condition in Q. We refer to such tuples as "certain tuples" and "maybe tuples," respectively.

This partitioning of tuples into certain and maybe tuples induces a partitioning of the server-side query $Q^S$ into two parts: $Q_m^S$ and $Q_c^S$. While $Q_c^S$ can be computed completely at the server computer 102 (and is not subject to further processing at the client computer 100), the results of $Q_m^S$, on the other hand, need to be decrypted and filtered via $Q^C$. The savings from such a partitioning can be tremendous, especially for queries involving aggregation as the final step, since aggregation over $Q_c^S$ can be computed directly at the server computer 102, while tuples in $Q_m^S$ have to be decrypted and aggregated at the client computer 100. We refer to such a data-induced partitioning of $Q^S$ into $Q_m^S$ and $Q_c^S$ as data level partitioning. Of course, if data level partitioning is used, the results of the two server-side queries must be appropriately merged at the client computer 100 to produce an overall answer to the query.

Another generalization of the basic strategy considered involves multiple interactions between the client computer 100 and the server computer 102. The framework described above implicitly implies that the server computer 102 performs the tasks assigned in $Q^S$ query (including $Q_c^S$ and $Q_m^S$, if they exist) and sends the results, which are subject to decryption and filtering, to the client computer 100, thereby concluding the computations performed by the server computer 102. However, there are cases where the server computer 102 communicates with the client computer 100 by sending maybe tuples as intermediate results for filtering instead of "carrying" them to later operations. The server computer 102 continues its computations after receiving the filtered results from the client computer 100, which include only certain tuples in this case. This process describes multi-round trips between the client computer 100 and the server computer 102. In this application, we will formally discuss multi-round trip based query processing over encrypted databases including exploitation of the idea in query optimization.

In the next three subsections, we discuss how the operator and data level partitioning can be achieved, and illustrate the multi-round trip communications between the client computer 100 and the server computer 102.

3.1. Operator Level Partitioning

Since operator-level partitioning has been extensively studied in [14], we explain the basic idea using an example query over the employee and manager tables. The sample population of employee table is given in Table 1 and the partitioning scheme of salary attribute of employee is given in Table 3:

TABLE 3

| Partitions for employee.salary employee.salary | |
|---|---|
| Partitions | ID |
| [0, 25K] | 59 |
| (25K, 50K] | 49 |
| (50K, 75K] | 81 |
| (75K, 100K] | 7 |

Figure 2A:
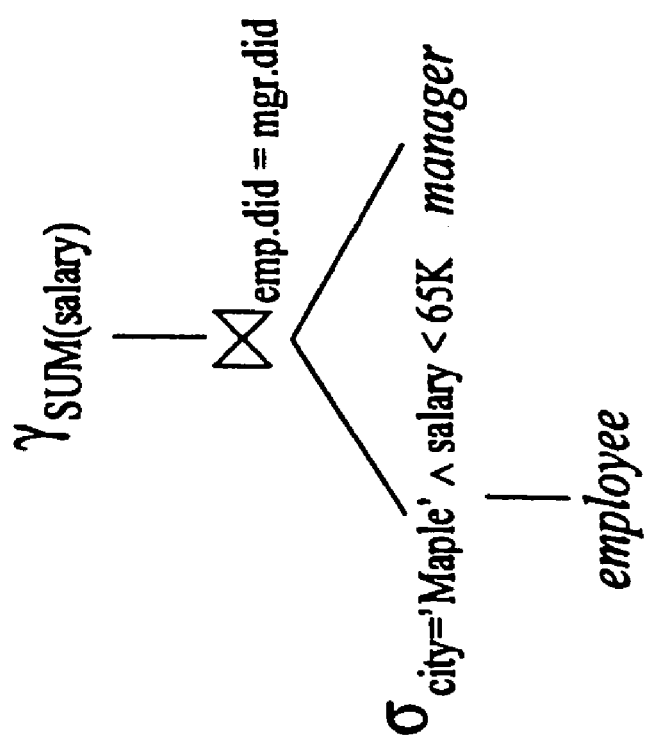
FIGS. 2(a)-(c) are query trees that illustrate operator and data level query partitioning according to the preferred embodiment of the present invention.

Consider the following query:
SELECT SUM (salary)
FROM employee, manager
WHERE city='Maple' AND salary<65K AND emp.did=mgr.did An algebraic representation of the query is given as:

$$\gamma_{Sum(salary)}(\sigma_{c'} \text{EMPLOYEE} \bowtie_{emp.did=mgr.did} \text{MANAGER})$$

where c' is city='Maple'^salary<65K. A query tree corresponding to this query is shown in FIG. 2(a).

Based on the schemes presented in [14], the sample population given here, and data partitions, the server-side query can be formulated as follows:

$$\pi_{etuple}\sigma_{c'} \text{EMPLOYEE}^S \bowtie_{emp^S.did=mgr^S.did} \text{MANAGER}^S$$

where c' is $city^f = \epsilon(\text{'Maple'})^{\wedge} salary^{id} \epsilon \{49, 59, 81\}$.

The server computer 102 inserts the results of this query into a temporary data source, known as STREAM. Then, the client computer 100 executes the following client-side query to finalize the processing:

$$\gamma_{Sum(Salary)} \sigma_{salary<65K} \Delta(\text{STREAM})$$

Here, the $\Delta$ operator denotes a decryption operation. For now, we can just assume that the operator simply decrypts all encrypted data fed to it. We will discuss the definition and the use of $\Delta$ operator in more detail later.

Figure 2B:
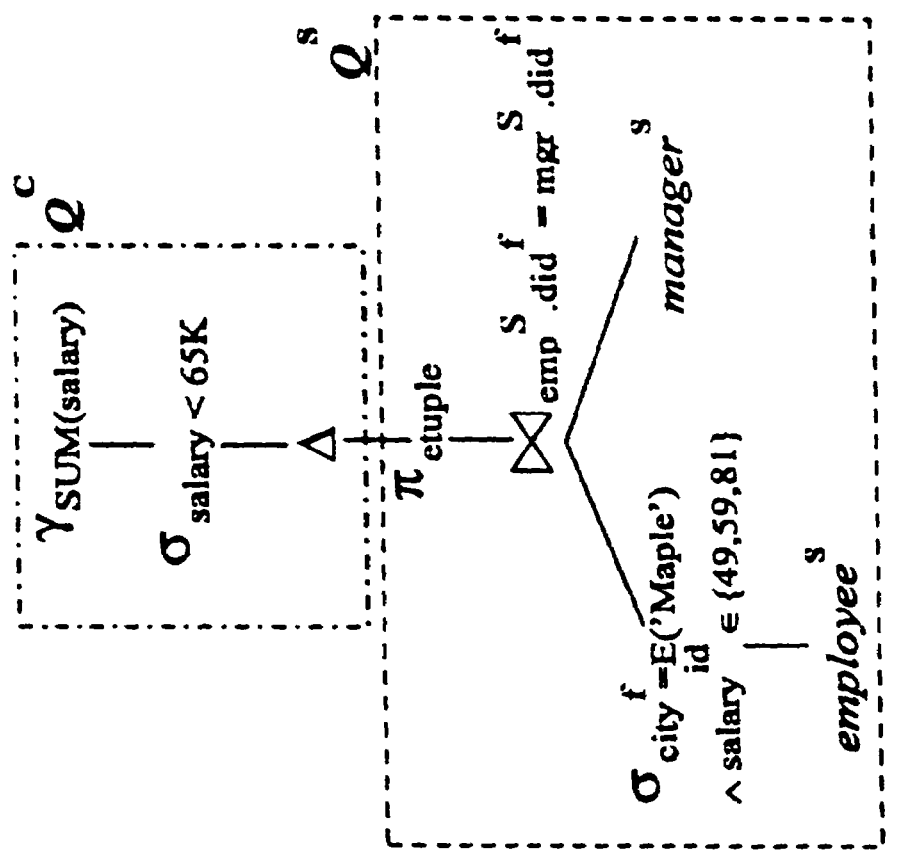

The server computer 102 uses the field level encrypted value of the city attribute. This allows an exact evaluation of the predicate, city='Maple', on encrypted values, given a deterministic encryption algorithm, which is used to compute encrypted values for city attribute. An inequality predicate, salary<65K, over the salary attribute is transformed into a predicate, $salary^{id} \epsilon \{49, 59, 81\}$, which uses partition ids. Note that all real values in partition 49 and 59 certainly satisfy the condition. However, partition 81 may or may not include values that satisfy the condition. Therefore, they are subject to client-side post-processing (i.e., filtering for false positives). This computation is performed by the client computer 100 in its execution of the selection operation, $\sigma_{salary<65K}$, in the client-side query. After this step, it is certain that all of the records satisfy all of the query conditions. The client computer 100 performs aggregation over those records to finalize the query processing. This presents operator level partitioning of the query. A corresponding query tree is shown in FIG. 2(b).

Note that, if we only use the operator-level partitioning, the aggregation operation has to be fully performed at the client computer 100. This requires decryption and filtering of all of the records returned by the server-side query. In the following section, we show how the client computer 100 overhead and decryption cost can be reduced by exploiting data level partitioning.

3.2. Data Level Partitioning

As mentioned previously, data level partitioning splits the server-side query $Q^S$ into two parts, $Q_c^S$ and $Q_m^S$, based on separating the records that qualify the conditions in $Q^S$ into two portions: those portions that certainly satisfy the condition of the original query Q and those portions that may or may not.

Certain Query ($Q_c^S$): selects tuples that certainly qualify the conditions associated with Q. The results of $Q_c^S$ can be aggregated at the server computer 102.

Maybe Query ($Q_m^S$): selects tuples corresponding to records that may qualify the conditions of Q, but it cannot be determined for sure without decrypting.

We illustrate data level partitioning below using an example query over the employee and manager tables considered earlier. The previous section showed how such a query can be split into a client-side and server-side queries, $Q^S$ and $Q^C$. We now show the split that would result if we further considered data level partitioning.

The resulting queries $Q_c^S$ and $Q_m^S$ would be as follows:

1. $Q_c^S$: SELECT $SUM^{PH}$ ($SALARY^h$)
FROM $employee^S$, $manager^S$
WHERE $city^f$=$\epsilon$('Maple')
AND ($salary^{id}$=49 OR $salary^{id}$=59)
AND $emp.did^f$=$mgr.did^f$ 2. $Q_m^S$: SELECT $employee^S$.etuple, $manager^S$.etuple
FROM $employee^S$, $manager^S$
WHERE $city^f$=$\epsilon$('Maple')
AND $salary^{id}$=81
AND $emp.did^f$=$mgr.did^f$ The rationale for the above split is that given the partitioning scheme given in Table 3, we know that tuples corresponding to partitions 49 and 59 certainly satisfy the condition specified in the original query (salary<65K). Thus, those tuples can be collected and aggregated at the server computer 102 by exploiting PH. $Q_m^S$ selects tuples which may satisfy the original query condition (but the server computer 102 cannot determine if they do). In our example, these correspond to the first two tuples of the $employee^S$ relation (see Table 2). The query returns the corresponding etuples to the client computer 100.

Figure 2C:
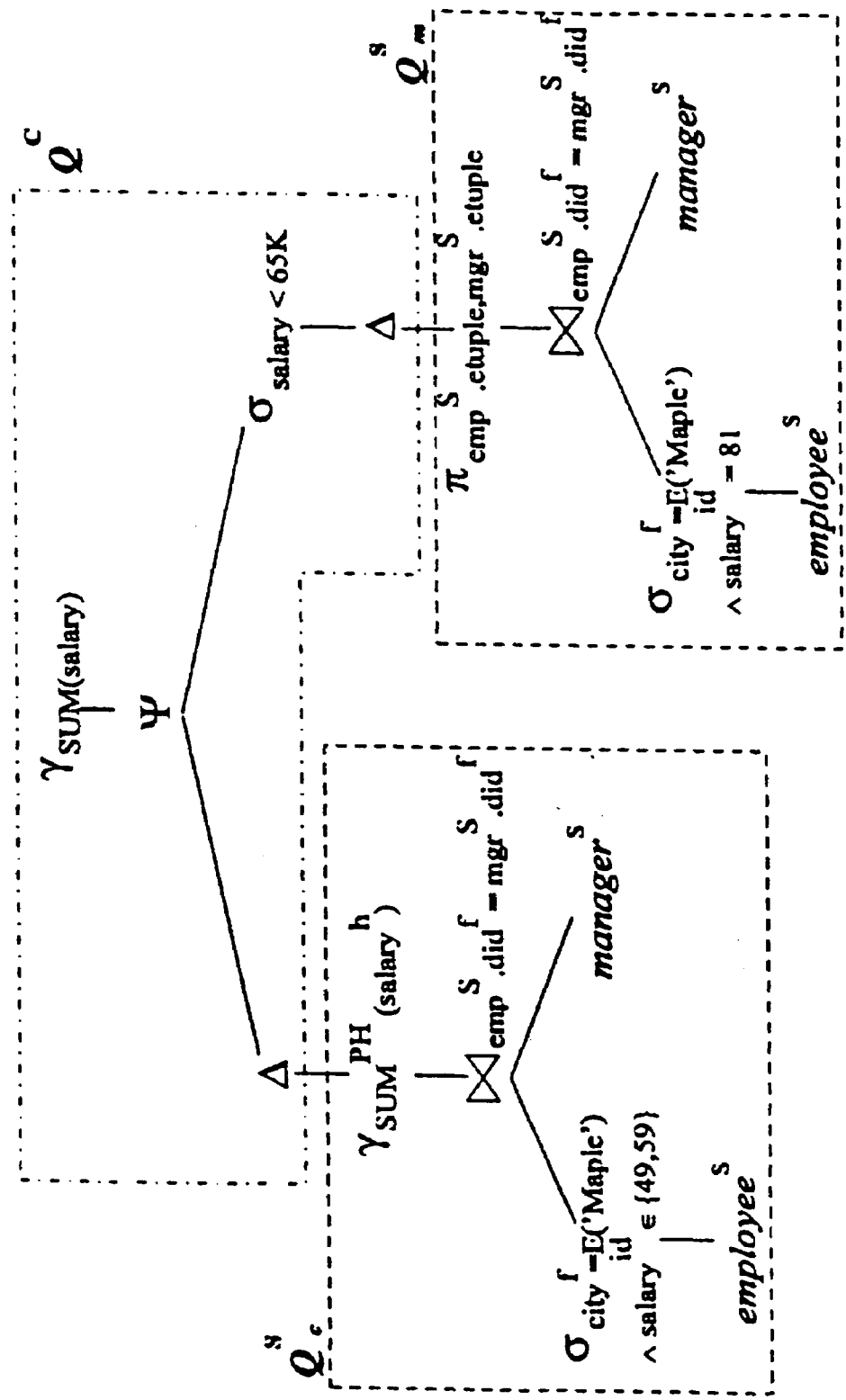

Upon decryption, the client computer 100 can determine that the first tuple, which has salary=70K, does not satisfy the query and should be eliminated. The second tuple, however, which has salary=60K, satisfies the query condition and should be taken into account. The client computer 100 finalizes the computation by merging the answer returned by the first and second queries. This presents data level partitioning of the query. A corresponding query tree is shown in FIG. 2(c). In the query tree, the $\psi$ operator represents a merge operation.

The above example illustrates that data level partitioning of $Q^S$ can significantly benefit aggregation queries by reducing the amount of work that needs to be done at the client computer 100, i.e., the client computer 100 does not need to decrypt or aggregate tuples that can be fully resolved at the server computer 102. A natural issue is that of characterizing the set of query rewrite rules and developing an algorithm to derive $Q_c^S$ and $Q_m^C$ given Q and the partitioning schemes for various attributes.

The reasoning behind such an algorithm is as follows. Given Q, $Q_c^S$ and $Q_m^S$ can be derived by marking attribute partitions in the WHERE part of the query as those that generate either maybe or certain tuples based on the partitioning scheme of the attributes. The WHERE clause can be split into two parts: a first part for which each of the conditions refer to partitions marked certain and a second part that may contain both certain and maybe partitions. This naturally leads to two queries, $Q_c^S$ and $Q_m^S$.

3.3. Round-Trip Communications

As introduced above, there are cases where it is more beneficial sending maybe tuples to the client computer 100 for intermediate filtering. The client computer 100 decrypts those tuples, applies any needed processing, e.g., elimination of false positives, and sends back only the tuples that correspond to true positives to the server computer 102. This operation is represented by an $\omega$ operator, known also as a "round-trip filtering operator," in the query tree. The output of this operator includes only certain records.

Figure 3:
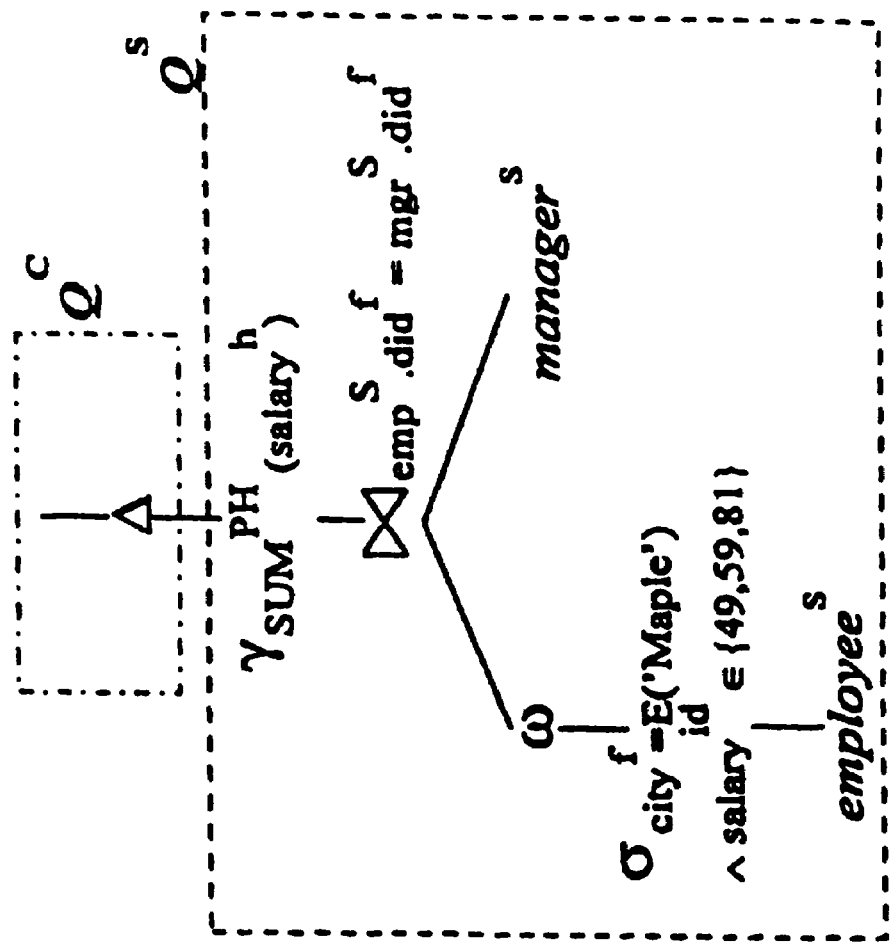
FIG. 3 is a query tree that illustrates a round-trip filtering operator according to the preferred embodiment of the present invention.

We illustrate the use of a round-trip filtering operator in FIG. 3. The query tree represents the same query used in Section 3.1. Differently from the previous case, the server computer 102 communicates with the client computer 100 after the selection operator, $\sigma_{city^f=\epsilon('Maple')^\wedge salary^{id}\in\{49,59,81\}}$. Recall that partition 81 produces maybe tuples as it may or may not contain records that satisfy the original query condition salary<65K. Instead of carrying those maybe tuples, the server computer 102 sends them to the client computer 100 and receives back only the tuples that satisfy the original condition. Since the client computer 100 can perform decryption, the client computer 100 performs this filtering. As the remaining operators do not produce more maybe tuples, the server computer 102 is able to perform the rest of the computation over encrypted records, including the aggregation operation. The client computer 100 receives only the aggregate value and decrypts it to complete the processing of the query.

Although it might be very useful, this strategy should be used judiciously. In this example, filtering the intermediate results saves the client computer 100 from performing a large number of decryptions in the end to be able to compute the aggregation. However, it requires decryption and filtering of maybe records. Both cases are involved with network usage at potentially different capacity. Consequently, the decision on how to use the multi-round strategy should be made based on performance requirements and specifics of a given system. This motivates a cost based strategy for query plan generation. We will present such a strategy later in the application.

4. Optimization

It is obvious that a rich set of possibilities exist for placing $\Delta$ and $\omega$ operators in a query tree, and that different placements of those operators can result in different query execution plans, which may have significantly different resource utilization and consumption. Therefore, the decision on a query execution plan should be made judiciously based on some criteria that considers system and application specific requirements.

In this section, we study the query plan selection problem. First, we present an optimal placement of $\Delta$ and $\omega$ operators in a given query tree. That query tree may be provided by any other source, such as traditional query optimizer. After that, the objective of an optimization algorithm is to find the "best" places for the $\Delta$ and/or $\omega$ operators.

Our optimization algorithms follow a "cost-based" approach. However, we do not assume any cost metric for optimality criteria. We only use a specific cost metric to give examples to present the ideas. Therefore, the algorithms can be integrated with any cost metric desired.

Different placements of $\Delta$ or $\omega$ operators may have a significant impact on the performance of query execution. Assume that the cost metric is defined as the number of encrypted tuples sent to the client computer 100 for processing. Those tuples are subject to decryption, which is the cost-dominant operation for the client computer 100 [15]. Consider a join for tables R and S over attributes R.a and S.a. Assume that the sizes of tables are $10^3$ and $10^5$ for R and S, respectively. Also assume that number of unique values for R.a and S.a is 100. If we compute the join operation at the server computer 102 and send the (encrypted) results to the client computer 100, the join operation can be formulated as $\Delta(R \bowtie_{R.a=S.a} S)$. In this case, the number of encrypted tuples that are fed to the $\Delta$ operator, which is executed at the client computer 100, is $10^6$. The output size of the join operator is estimated by using the formula given in [12]:

$$\frac{T(R_1) * T(R_2)}{\max\{V(a, R_1), V(a, R_2)\}}$$

where $T(R_r)$ is number of tuples in the relation, and $V(a, R_i)$ is number of distinct values of attribute a of $R_i$.

However, if we compute the join operation at the client computer 100 as $\Delta R \bowtie_{R.a=S.a} \Delta S$, then the number of tuples that have to be decrypted at the client computer 100 is $1.01 \times 10^5$, which is a significant difference for the cost of query execution. Similar observations can be made for placement of the $\omega$ operator. Therefore, it is obvious that placement of the $\Delta$ or $\omega$ operators should be decided via cost-based optimization algorithms.

4.1. Definitions and Notations

So far, we have informally presented how to partition a given query into multiple parts to facilitate client-side and server-side processing. In this section, we formalize query representation, which will establish a basis for query optimization. We first provide the necessary definitions and introduce new operators that are used in query formulations in the context of our work.

Query tree: A query tree is a directed acyclic graph $G=(V, E)$, consisting of nodes V and edges $E \subset V \times V$. The internal nodes of the tree are relational algebra operators and the leaf nodes are base relations, $R_i: 1 \leq i \leq n$. The edges specify flow of data.

For an edge $e=(u,v): u, v \in V$, if the relational operator corresponding to u produces maybe records, then we state that, the edge "carries" maybe records.

Path: In a query tree $G=(V,E)$, a path from a node v to a node v' is a sequence $(v_0, v_1, \ldots, v_k)$ of nodes such that $v=v_0$, $v'=v_k$, and $(v_{i-1}, v_i) \in E$ for $i=1, 2, \ldots, k$.

Relational algebra operators: In this study, we consider query expression trees that may contain relational operators from two classes: binary operators denoted by $\odot=\{\bowtie, \rightarrow, \leftarrow\}$ ($\bowtie$ represents a join, $\rightarrow$ represents a left outerjoin and $\leftarrow$ represents a right outerjoin) and unary operators denoted by $\odot=\{\pi, \delta, \sigma, \gamma\}$ ($\pi$ represents projection, $\delta$ represents duplicate elimination, $\sigma$ or represents selection and $\gamma$ represents grouping and aggregation). Let $\odot_p$ denote a binary operator involving predicate p, then a query tree T with left subtree $T_l$, right subtree $T_r$, and root $\odot_p$ is denoted by $(T_l \odot_p T_r)$.

Renaming base relations: A base relation of a query tree is renamed with a unique identifier $R_i: 1 \leq i \leq n$, where n is number of leaves (i.e., base relation) of the tree. (Note that even a relation that occurs in multiple leaves is assigned with different identifier.) Here, i denotes the index of the base relations. We define the set of base relation indexes as $\Pi = \{i | 1 \leq i \leq n \text{ and } i \text{ is index of base relation } R_i\}$.

Label of an edge: The label of an edge $e=(u, v)$, label(e), is the set of base relation indexes of the relations of which u is ancestor.

$\Delta$ operator: $\Delta_L$ signifies a "last-trip decryption operator" (or last interaction or one way trip) for decryption. This means that, if a $\Delta$ operator is placed on a path, then above the $\Delta$ operator the execution is performed at the client computer 100, while below the $\Delta$ operator the execution is performed at the server computer 102. Thus, placement of $\Delta$ operator(s) naturally separate some "top" portion of the query tree from a "bottom" portion of the query tree, thereby defining a boundary between the computations performed by the client computer 100 and the server computer 102. In the process, the server computer 102 sends all the intermediate results to the client computer 100 and requests the needed decryptions. This concludes the server-side query processing. According to the system model, all intermediate results are in encrypted form. The server computer 102 does not receive anything back from the client computer 100 after the issuance of the $\Delta_L$ operator, and hence, query processing is finalized at the client computer 100.

L is a set of base relation indexes of the relations of which the $\Delta_L$ operator is an ancestor in the query tree. In the most general case, the $\Delta_L$ operator implies decryption of all of the attributes of the schema of the expression passed to the operator. The expression can be a base relation, for example, $R_i^S$ where $R_i^S$ is an encrypted base relation; or any query expression represented by a subtree, for example, $E^S$ where $E^S$ is a query expression. Assume that $E^S$ is any query expression and the schema of $E^S$ is $\text{sch}(E^S)=\{A_1^S, \ldots, A_m^S\}$ where $A_i^S$: $1 \leq i \leq m$ are encrypted forms of corresponding original attributes of $A_i: 1 \leq i \leq n$. Then, $E^S$ passed to $\Delta$ results in the expression E, whose schema is $\text{sch}(E)=\{A_1, \ldots, A_m\}$, where $A_i: 1 \leq i \leq m$ are decrypted forms of corresponding encrypted attributes of $A_i^S: 1 \leq i \leq m$.

$\omega$ operator: The $\omega$ operator represents a round-trip filtering operator for identifying communication between the client computer 100 and the server computer 102 as described in Section 3.3. The server computer 102 communicates with the client computer 100 by sending only the maybe records for intermediate processing. The client computer 100 decrypts those records and applies any needed processing, e.g., elimination of false positives, and sends back only the records that correspond to true positives to the server computer 102. The output of this operator includes only the certain records. Consequently, the nature of the $\omega$ operator is different from that of the $\Delta$ operator. The server computer 102 temporarily transfers control of the query processing to the client computer 100 and later receives control back if the $\omega$ operator is used, whereas control of query processing is completely transferred to the client computer 100 and is never transferred back to the server computer 102 if the $\Delta$ operator is used.

$\omega$-eligible edge: A $\omega$-eligible edge is an element of E and is any edge that carries maybe records.

4.2. Query Re-Write Rules

In order to generate alternate query execution plans, it is necessary to move the $\Delta$ and $\omega$ operators around in the query tree. This requires re-write rules, which define the interaction of those operators with relational algebra operators.

The $\omega$ operator does not pose any difficulty in terms of pulling it up and/or pushing it down in the query tree, because the sole purpose of the $\omega$ operator is filtering out maybe records. As a result, eliminating false positives does not affect the correctness of operators in the nodes above and below a node representing the ω operator.

However, the Δ operator requires special attention, as described below.

Re-write rules for the Δ operator: The Δ operator can be pulled up above any unary and binary operator in a query tree, except for a GroupBy operator. (We will discuss the case of the GroupBy operator in more detail below.)

Formally, the re-write rules are set forth as follows:

$$\Delta_{L_1} E_1^S \odot_p \Delta_{L_2} E_2^S = \odot_{p'}^C \Delta_{L_1 \cup L_2} (E_1^S \odot_{Map_{cond}(p)}^S E_2^S) \ominus_p \Delta_{L_1} E_1^S = \ominus_{p'}^C \Delta_{L_1} \odot_{Map_{cond}(p)}^C E_1^S$$

where $E_1^S$, $E_2^S$ are query expressions, and $\odot^C$ and $\ominus^C$ represent the computation of the translated operators by the client computer 100. Similarly, $\odot^S$ and $\ominus^S$ represent the computation of the translated operators by the server computer 102. Further, p' represents the filtering conditions for the translated operators performed by the client computer 100. Details of those translations are described in [14].

The $Map_{cond}$ function maps query conditions into new ones that can be evaluated over encrypted data. The definition of $Map_{cond}$ is fully discussed in [14].

In addition, we exploit the field level encrypted attributes of the encrypted relation. We can test the equality of two attribute values directly over their encrypted values as $A_i = A_j \Leftrightarrow \epsilon_k(A_i) = \epsilon_k(A_j)$, where $\epsilon_k$ is a deterministic encryption algorithm with key k. Thus, $$Map_{cond}(A_i = v) \equiv A_i^f = \epsilon(v)$$

where v is a given value in the original condition, and $$Map_{cond}(A_i = A_j) \equiv A_i^f = A_j^f$$

We assume that there is a field level encrypted attribute and a partitioning attribute corresponding to any attribute of the original table. To evaluate equality predicates and the corresponding field level encrypted attribute, and to evaluate inequality predicates, the corresponding partitioning attribute is used. Therefore, we use the condition mappings given above to test the equality of encrypted attribute values.

GroupBy and Aggregation (γ) operator: A grouping and aggregation operation is denoted by $\gamma_L(R)$, where $L=L_G, L_A$. $L_G$ refers to a list of attributes on which the grouping is performed, and $L_A$ corresponds to a set of aggregation operations. As an example, the operation $\gamma_{C,COUNT(B) \to F}(R)$ means that we create groups using attribute C of relation R, and for each group, compute the COUNT(B) function. That is, $L_G=\{C\}$, and $L_A=\{COUNT(B) \to F\}$. The resulting relation will contain two attributes C and F. A tuple in the result will have an entry for each distinct value of C, and the number of tuples in the group is reported as attribute F. We will use the "GroupBy" operator, in short, to refer to the "GroupBy and Aggregation" operator.

Consideration for GroupBy operator: The Δ operator can be pulled up above of any unary and binary operator in a query tree except the GroupBy operator. If the edge e between a Δ operator and a GroupBy operator $\gamma_{L_G,L_A}$, i.e., $e=(\Delta, \gamma_{L_G,L_A})$, carries maybe records and $L_A \neq \emptyset$, then the Δ operator cannot be pulled up above the GroupBy operator. For this case, we have three options: 1) use a ω operator, 2) pull up the GroupBy operator in the tree (which does not solve the problem but may provide an opportunity for the creation of alternative plans), and 3) consider the GroupBy operator as a boundary and find the best plan from the available set of plans.

We have discussed the use of the ω operator in Section 3.3. Moving the GroupBy operator in the query tree is related to the general query optimization problem and re-write rules in that context [4]. Below we provide pull up rules for the GroupBy operator.

If the result of a GroupBy operator, which is defined above, is used by other relational operators that are above the GroupBy operator in the query tree, then this creates a dependency relationship between the GroupBy operator and those other operators. Formally, if the edge e between a node v and a GroupBy operator $\gamma_{L_G,L_A}$, defined as $e=(v, \gamma_{L_G,L_A})$, carries maybe records and $L_A \neq \emptyset$, and another binary or unary operator $O_p$ is on the path from the γ node to the root of the query tree and predicate p of O uses the results of γ, then we define O as depending on γ.

Pull up rules for GroupBy (γ) operator: In this study, pull up re-write rules are particularly interesting to the optimization process. The GroupBy operator can be pulled above a unary operator (other than γ itself) if and only if all columns used in the unary operator are functionally computed by the grouping columns of the input relation.

Consider the following example, which selects total revenue for those stores whose zip code is different from 95141, i.e., $\sigma_{zip \neq 95141} \gamma_{zip,SUM(revenue)}(SALES)$. The GroupBy operator computes exactly one value per group, i.e., a row for each zip, and the selection operator filters the row having zip=95141 as its value. For this example, the GroupBy can be pulled up above the selection operator, i.e., $\gamma_{zip,SUM(revenue)} \sigma_{zip \neq 95141}(SALES)$, because the selection operator filters the whole group that generated the row.

Generally, the GroupBy operator can be pulled above a binary operator if: 1) the relation on the left has a key and 2) the predicate of the operator does not use the result of the aggregate function. Then, $$R_1 \odot_p \gamma_{L_G,L_A}(R_2) = \gamma_{L_G \cup sch(R_1),L_A}(R_1 \odot_p R_2).$$

4.3. Optimization Algorithm

In this section, we provide optimization algorithms to optimally place the Δ and ω operators in a given query tree. We first present an algorithm that only deals with Δ operators, and then we provide another algorithm that considers both Δ and ω operators together by utilizing the first algorithm.

4.3.1. Optimization for Δ Operators

In this section, we discuss an optimization algorithm, which optimally places Δ operators only in a given query tree. The steps of the algorithm are set forth below:

Input: A query tree G=(V, E)
Output: bestPlan
1. let E' comprise a set of η where η ⊂ E such that $$\bigcap_i label(e_i) = 0 \wedge \bigcup_i label(e_i) = \Pi : e_i \in \eta$$

2. bestPlan=a dummy plan with infinite cost
3. for all η∈E'
4. place Δ on each edge $e_i$: $e_i \in \eta$
5. if p is realizable then
6. if cost(p)<cost(bestPlan) then bestPlan=p
7. endfor
8. return bestPlan There are pre-processing steps before the execution of the algorithm as given below.

Pre-Processing Over a Given Query Tree:
Renaming base relations: We rename the base relations as described in Section 4.1.

Creation of set of Δ operators: We put a $\Delta_i$ operator as an adjacent node above each leaf node (base relation $R_i$) in the query tree.

Labeling the edges: Labels of the edges of the query tree are created in a bottom-up fashion. Initialization of the process starts with the creation of the labels of the edges $e_i=(R_i, \Delta_i)$, where $R_i$ is leaf level node (a base relation) and $\Delta_i$ is a corresponding Δ operator added to the query tree. Then, label (e) of an edge e=(u, v): u, v∈V is created as label(e)=∪label (e'), e'=(w,u): w,u∈V.

Figure 4:
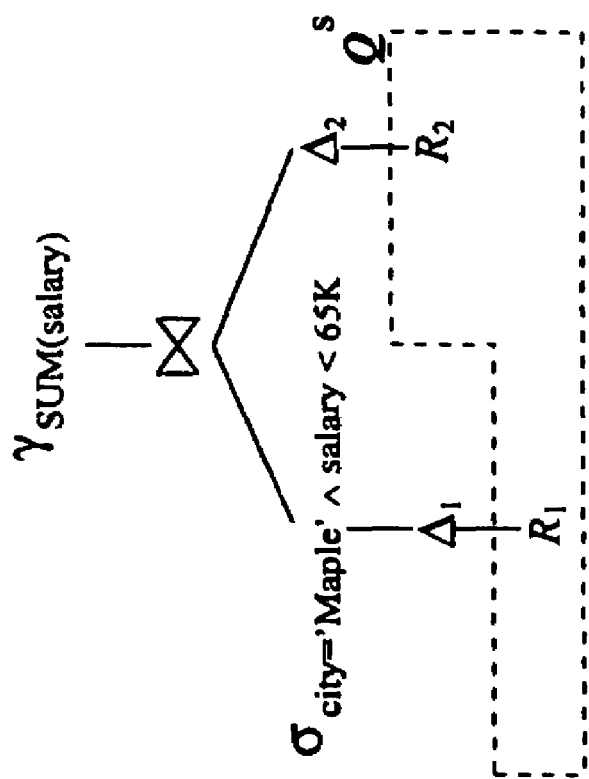
FIG. 4 is a query tree that illustrates a last-trip decryption operator according to the preferred embodiment of the present invention.

The starting point for the algorithm is an original query tree, for example, the query tree of FIG. 2(a). We first rename the relations and replace them with the server-side representations of the relations (i.e., encrypted ones). After this step, we place Δ operators in their initial positions. Such a query tree, based on FIG. 2(a), is shown in FIG. 4. Starting with that plan, the optimization algorithm enumerates valid query plans by placing Δ operators at different valid locations, using the rewrite rules. A possible outcome of the algorithm can be the plan shown in FIG. 2(b). Note that, to explain the procedure, we provide an example with operator level partitioning only. However, the algorithm works in exactly the same way if data level partitioning is available in the system.

The algorithm enumerates all possible sets of edges, η, in Line 1. Those sets have two properties: labels of the edges included in the set are disjoint and the labels of the edges in the set constitute the set of base relation indexes, Π, when they are combined. The first property ensures the uniqueness of the set, while the second property ensures the completeness of the set. This means that all of the tuples from all of the encrypted tables, which are needed to correctly finalize query processing, are sent to the client computer 100.

After that step, the algorithm places Δ operators on each edge of the selected set in Line 4. This creates a unique query execution plan p augmented with Δ operators. At this stage, the algorithm determines whether the generated query plan is realizable in Line 5. To do this, the Δ operators in the generated plan are pulled up from their initial locations (above the base encrypted relations) to the locations determined by the plan using the rewrite rules given in Section 4.2. If they can be pulled up, then this constitutes a realizable query execution plan. Then, the algorithm computes the cost of the plan in Line 6. The cost of a plan, cost(p), is defined based on a cost metric determined for a system setup. This cost is compared with the minimum cost plan so far. The algorithm returns the plan with minimum cost after examining all possible plans.

4.3.2 Optimal Placement of ω Operators

The placement of ω operators is essentially different from the placement of Δ operators. Once a Δ operator is placed as a node, the server computer 102 transfers the encrypted records to the client computer 100 and control of the query processing never returns to the server computer 102. Consequently, query processing by the server computer 102 is complete for that branch of the query tree. Therefore, there may not be more than one Δ operator on a path in a query tree.

Processing of ω operators, however, is different. The server computer 102 re-gains control over query processing when a round-trip, which is defined by an ω operator, between the client computer 100 and the server computer 102 is completed. Thus, on a path from a root of the query tree to a node, there may be as many ω operators as there are edges on the path. As a result, the optimal placement algorithm for ω operators considers any combination of the edges in a given query tree.

4.3.3 Three Phase Optimization Algorithm

In this section, we discuss an optimization algorithm that considers both Δ and ω operators to determine an optimal query execution plan, which is set forth below:

Input: A query tree G=(V,E)
Output: bestPlan
/* First Phase */
1. let E' comprise a set of η where η ⊂ E such that $$\bigcap_i \text{label}(e_i) = 0 \wedge \bigcup_i \text{label}(e_i) = \Pi : e_i \in \eta$$

2. perform pre-processing steps on G
3. pull Δ operators up to highest possible locations applying re-write rules
/* Second Phase */
4. bestPlan=a dummy plan with infinite cost
5. for all S ⊆ E
6. place ω on each ω eligible edge $s_i$:$s_i$∈S
7. if cost(p)<cost(bestPlan) then bestPlan=p
8. endfor
9. define query tree G'=(E', V')
/* Third Phase*/
10. perform pre-processing steps on G'=(E', V')
11. let E^η comprise a set of η where η ⊂ E' such that $$\bigcap_i \text{label}(e_i) = \emptyset \wedge \bigcup_i \text{label}(e_i) = \Pi : e_i \in \eta$$

12. for all η∈E^η
13. place Δ on each edge $e_i$: $e_i$∈η
14. if cost(p)<cost(bestPlan) then
15. if p is realizable then bestPlan=p
16. endfor
17. return bestPlan The algorithm operates in three phases. The first phase, (lines 1-3), is initial placement of Δ operators without optimization. In pre-processing, Δ operators are placed in their initial positions, above the encrypted base relation in the query execution tree. After this step, Δ operators are pulled-up as high as possible, using rewrite rules given in Section 4.2. Here, a realizable query execution tree is created with a largest possible number of nodes included in server side query.

The second phase, (lines 4-9), operates on the query execution tree generated in the first phase and finds an optimal placements for ω operators. To do that, the algorithm looks for all subsets of E of the query execution plan G comprised of ω-eligible edges (in line 5), and places ω operators on the edges of those subsets (in line 6). Then, it selects the best plan with an optimal placement of the ω operators. This phase generates a query execution tree, which (possibly) includes ω operator nodes.

In the third phase, (lines 10-17), part of the query execution tree generated by the second phase is fed to the third phase, which places Δ operators in their final locations. In the algorithm, that part of the tree is denoted as G'=(E',V'), which is defined as a part of the original query execution tree G=(E,V). V' ⊆ V is a set of nodes v such that there is no ω node on the path from the root of G to the node v, and E' ⊂ V'×V'. Intuitively, this is some "top" portion of the query execution tree, which does not have any ω operators in it, and which is generated by the first phase. Thus, it is subject to optimal placement of the ν operator(s). Recall that any valid query execution tree should have at least one $\Delta$ operator, for the reason that the results, in encrypted form, should be sent to the client computer 100 at some point in query processing.

5. Experimental Evaluation

To show the effectiveness of the optimization framework presented in Section 4, we used the TPC-H benchmark. Specifically, we used Query #17 of TPC-H benchmark [20], which is set forth below, with a standard TPC-H database created in scale factor 0.1, which corresponds to a 100 MB database in size.

```
select sum(1_extendedprice)
from lineitem, part
where p_partkey = 1_partkey and
    p_brand = 'Brand#23' and
    p_container = 'MED BOX' and
    1_quantity <
    (select 0.2 * avg(1_quantity) from lineitem where 1_partkey = p_partkey)
```

The query is a correlated nested query. Processing of nested query structures in encrypted databases has not been formally studied in the previous work [14]. In our studies, we have formally investigated nested query structures in the context of encrypted databases. However, we will keep our discussion on them limited to exemplify the query we use for the experimental analysis in this section.

There is previous work on unnesting SQL queries as presented by Kim [16], Muralikrishna [17], and Dayal [8]. In this study, we adopted the techniques presented by Galindo-Legaria [11] that provide query formulation and re-writes rules for unnesting and correlation removal. The work shows that a (correlated) nested query can be represented in a query tree having standard relational algebra operators.

After the application of transformations for unnesting given in [11], an algebraic representation of TPC-H Q #17 can be given as follows:

$\gamma_{Sum(l\_extendedprice)/7}(\text{LINEITEM} \bowtie_{1\_partkey=p\_partkey}$
$(\sigma_{1\_quantity<X}\gamma_{p\_partkey,0.2*Avg(l\_quantity) \to X}$
$(\sigma_C \text{PART} \bowtie_{1\_partkey=p\_partkey} \text{LINEITEM})))$ This query provides a basis for our experiments. As we discussed in Section 4.2, in some cases, pulling up GroupBy operators in the query tree creates further opportunities for optimization. To evaluate this case, we provide the following version of the query where the GroupBy operator, $\gamma_{p\_partkey,0.2*Avg(l\_quantity) \to X}$, along with the selection operator, $\sigma_{1\_quantity<X}$, is pulled up by using the re-write rules given in Section 4.2:

$\gamma_{Sum(l\_extendedprice)/7}\sigma_{1\_quantity<X}$
$\gamma_{p\_partkey,0.2*Avg(l\_quantity) \to X}$
$(\text{LINEITEM} \bowtie_{1\_partkey=p\_partkey}$
$(\sigma_C \text{Part} \bowtie_{1\_partkey=p\_partkey} \text{LINEITEM}))$ We partitioned those queries into server-side and client-side queries by using the techniques described in this application and used them as input to the optimization algorithms given in Section 4. For these experiments, our cost metric is defined as the number of encrypted tuples sent to the client computer 100 for processing.

We tested four different cases:

No optimization: For this case, we assume that there is no optimization framework available in the system. Thus, query processing follows the most straightforward method to partition the given query, which is storing the encrypted tables at the server computer 102 and transferring them to the client computer 100 as needed.

Single interaction: This case corresponds to the first optimization algorithm, which only considers $\Delta$ operators. Therefore, only one time interaction is allowed in the optimization.

Single interaction with pull-up: This case is an improvement upon the previous one by applying the re-write rules given in Section 4.2 to pull up the GroupBy operators to enable enumeration of a larger number of query execution plans.

Full optimization: This case corresponds to the second optimization algorithm, which utilizes both $\Delta$ and $\omega$ operators.

Figure 5:
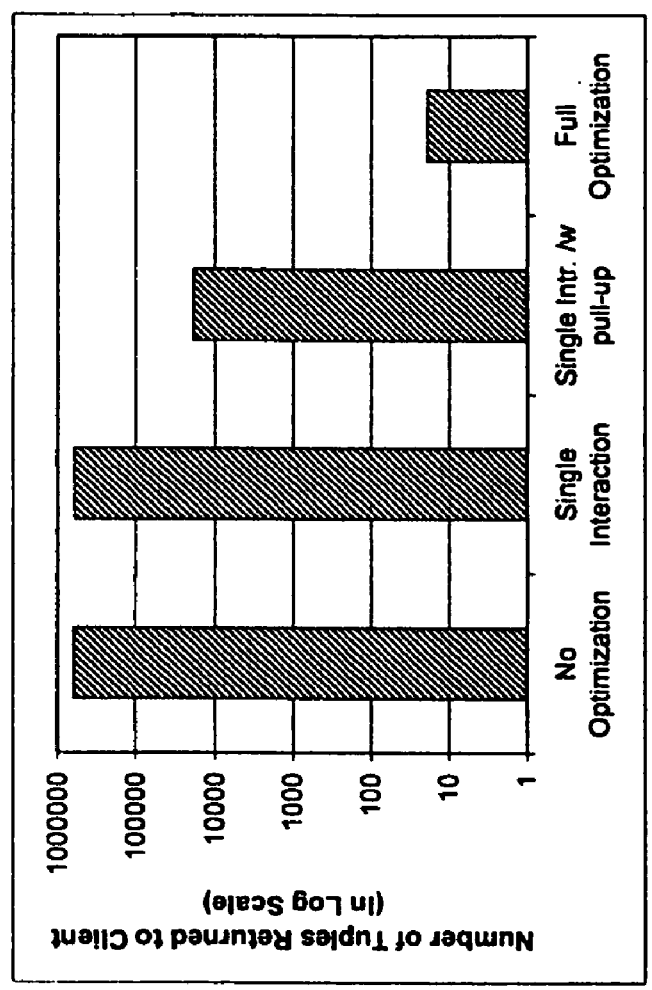
FIG. 5 is a graph that illustrates the number of tuples subject to post-processing according to the preferred embodiment of the present invention.
Figure 6:
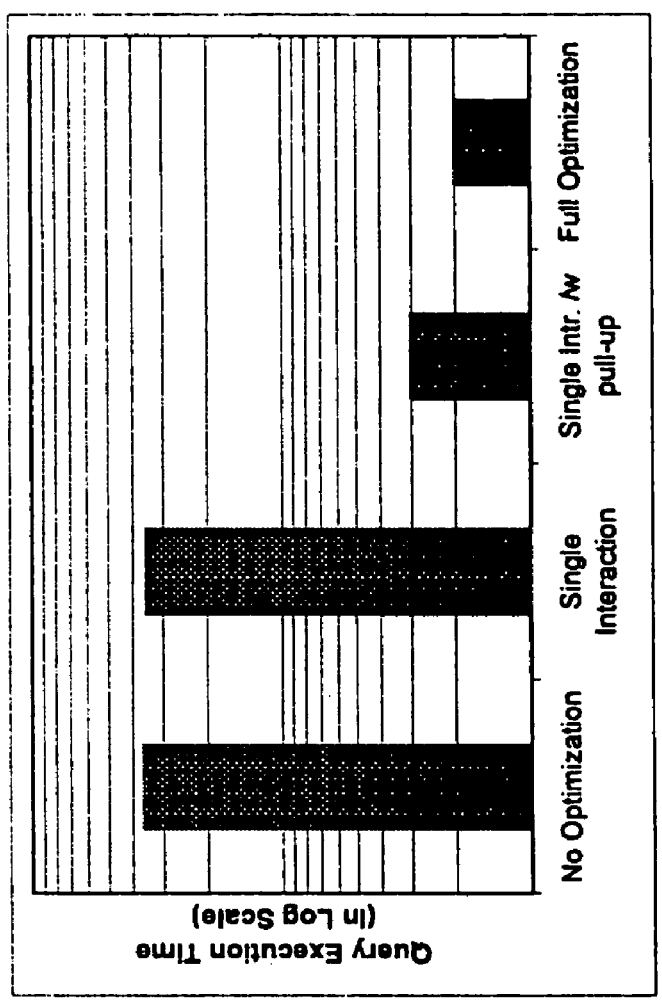
FIG. 6 is a graph that illustrates query execution times for different strategies according to the preferred embodiment of the present invention.

We report two sets of results in FIGS. 5 and 6. FIG. 5 shows the number of encrypted tuples returned to the client computer 100 for processing for each of the cases above. No optimization case shows the worst performance.

The single interaction case provides little improvement. The main reason is the selection operator, $\sigma_{1\_quantity<X}$, which has inequality predicate on an aggregate value. As this cannot be evaluated with certainty, it forces the transfer of one encrypted copy of Line item table to the client computer 100.

However, the single interaction with pull-up case addresses that point by pulling up the aggregation operator $\gamma_{p\_partkey,0.2*Avg(L\_quantity) \to X}$ along with the selection operator, thereby significantly reducing the number of tuples sent to the client computer 100.

The full optimization case shows the best performance. It places an $\omega$ operator above the selection operator, which removes the maybe records and allows the rest of the query processing to be executed at the server computer 102 directly over encrypted records.

The behavior observed in the number of tuples sent to the client computer 100 directly impacts the query execution times as reported in FIG. 6. Query execution times follow the same behavior for corresponding cases.

6. Conclusions

We have studied the problem of query optimization in encrypted database systems. Our system setup was a database service provisioning system where the client computer 100 is the owner of the data and the server computer 102 hosts the data in encrypted form to ensure the privacy of the data. The server computer 102 never hosts the data in unencrypted form at any time. The previous work studied execution of SQL queries over encrypted relational databases in this kind of setup. It is always desired, as the purpose of service provider model, to minimize the work that has to be done by the client in this context. We formulated this concern as a cost-based query optimization problem and provided a solution.

We have presented a new concept, data level partitioning, that delivers significant performance improvements for certain classes of queries. We have also introduced and formally studied a new communication scheme between the client computer 100 and server computer 102, which allows more than one interaction between the client computer 100 and server computer 102 during query processing, whereas the previous work assumes that there is only a one time interaction. This new concept also allowed us to improve query execution plans substantially. We have conducted experimental tests to show the effectiveness of the schemes we presented in the application.

7. Logic of Preferred Embodiment

Figure 7:
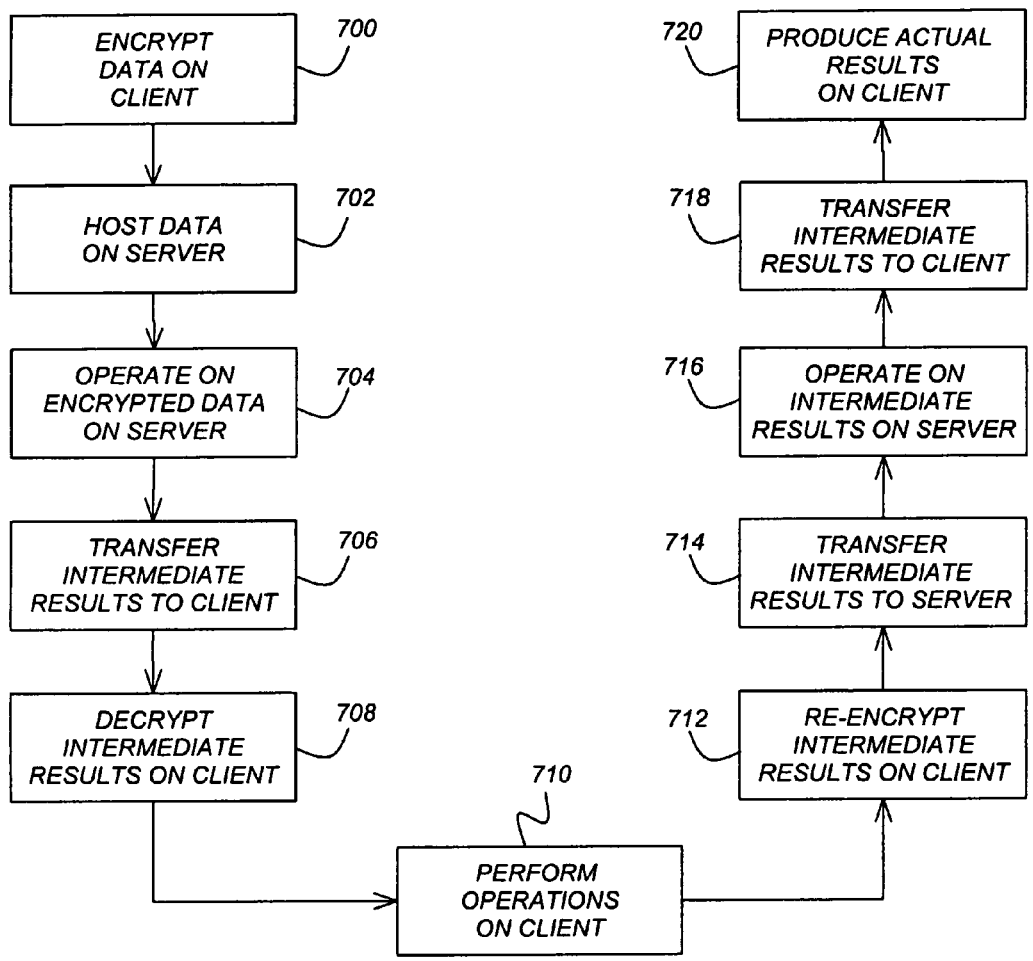
FIG. 7 is a flowchart illustrating a method of performing computations on encrypted data stored on a computer system according to the preferred embodiment of the present invention.

FIG. 7 is a flowchart illustrating a method of performing computations on encrypted data stored on a computer system according to the preferred embodiment of the present invention.

Block 700 represents the step of encrypting data at the client computer 100.

Block 702 represents the step of hosting the encrypted data on the server computer 102.

Block 704 represents the step of operating upon the encrypted data at the server computer 102 to produce an intermediate results set.

Block 706 represents the step of transferring the intermediate results set from the server computer 102 to the client computer 100.

Block 708 represents the step of decrypting the transferred intermediate results set at the client computer 100.

Block 710 represents the step of performing one or more operations on the decrypted intermediate results set at the client computer 100 to generate an updated intermediate results set. These operations may comprise logical comparison operations, filtering operations, sorting operations, or other operations.

Block 712 represents the step of re-encrypting the updated intermediate results set at the client computer 100.

Block 714 represents the step of transferring the re-encrypted intermediate results set to the server computer 102.

Block 716 represents the step of operating upon the transferred intermediate results set at the server computer 102 to generate a new intermediate results set.

Block 718 represents the step of transferring the new intermediate results set from the server computer 102 to the client computer 100.

Block 720 represents the step of producing actual results from the transferred new intermediate results set at the client computer 100.

Figure 8:
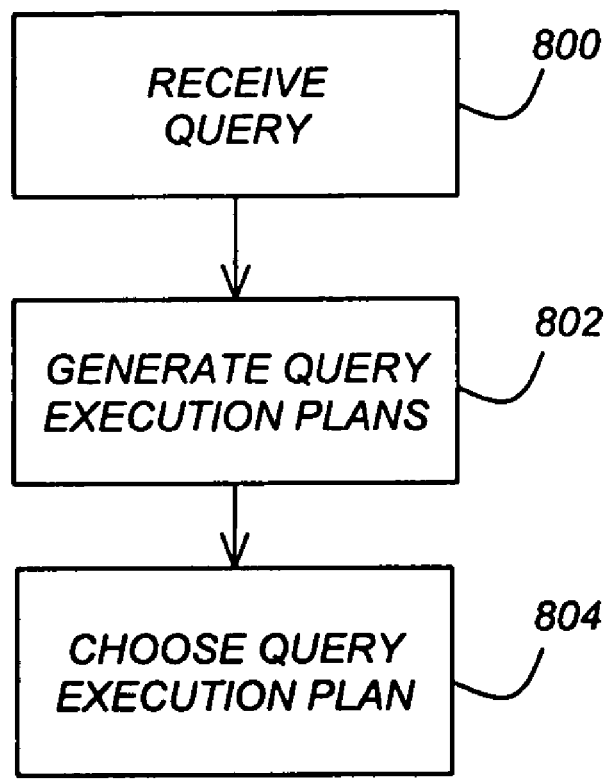
FIG. 8 is a flowchart illustrating a method of processing queries for accessing the encrypted data stored on a computer system according to the preferred embodiment of the present invention.

FIG. 8 is a flowchart illustrating a method of processing queries for accessing the encrypted data stored on a computer system according to the preferred embodiment of the present invention.

Block 800 represents the step of receiving a query from an end user.

Block 802 represents the step of generating a plurality of query execution plans from the query. The query execution plans are query trees having different placements of one or more round-trip filtering operators and a last-trip decryption operator. Generally, the query execution plans are generated to first optimize placement for the round-trip filtering operators and then to optimize placement for the last-trip decryption operator.

Block 804 represents the step of choosing one of query execution plans that optimizes placement of the round-trip filtering operators and/or the last-trip decryption operator.

In various embodiments, steps of Blocks 802 and 804 may be performed by the server computer 102, by the client upon receipt of the query from the client computer 100. However, those skilled in the art will recognize that the client computer 100 may perform these steps instead, or that one of these steps may be performed by the client computer 100 and the other of these steps may be performed by the server computer 102.

8. References

The following references are incorporated by reference herein:

[1] N. Ahituv, Y. Lapid, and S. Neumann. Processing Encrypted Data. Communications of the ACM, 30(9):777-780, 1987.

[2] E. Brickell and Y. Yacobi. On Privacy Homomorphisms. In Proc. Advances in Cryptology-Eurocrypt '87, 1988.

[3] S. Chaudhuri. An Overview of Query Optimization in Relational Systems. In Proc. of ACM Symposium on Principles of Database Systems (PODS), 1998.

[4] S. Chaudhuri and K. Shim. Including Group-By in Query Optimization. In Proc. of VLDB, 1994.

[5] Computer Security Institute. CSI/FBI Computer Crime and Security Survey. http://www.gocsi.com, 2002.

[6] ComputerWorld. J. P. Morgan signs outsourcing deal with IBM. Dec. 30, 2002.

[7] ComputerWorld. Business Process Outsourcing. Jan. 1, 2001.

[8] U. Dayal. Of nests and trees: A unified approach to processing queries that contain nested subqueries, aggregates, and quantifiers. In Proc. of VLDB, 1987.

[9] J. Domingo-Ferrer. A new privacy homomorphism and applications. Information Processing Letters, 6(5):277-282, 1996.

[10] J. Domingo-Ferrer. Multi-applications smart cards and encrypted data processing. Future Generation Computer Systems, 13:65-74, 1997.

[11] C. A. Galindo-Legaria and M. Joshi. Orthogonal optimization of subqueries and aggregation. In Proc. of ACM SIGMOD, 2001.

[12] H. Garcia-Molina, J. Ullman, and J. Widom. Database Systems: The Complete Book. Prentice Hall, 2002.

[13] G. Graefe and D. DeWitt. The EXODUS optimizer generator. In Proc. of ACM SIGMOD, 1987.

[14] H. Hacigumus, B. Iyer, C. Li, and S. Mehrotra. Executing SQL over Encrypted Data in Database Service Provider Model. In Proc. of ACM SIGMOD, 2002.

[15] H. Hacigumus, B. Iyer, and S. Mehrotra. Providing Database as a Service. In Proc. of ICDE, 2002.

[16] W. Kim. On optimizing an SQL-like nested query. ACM Transactions on Database Systems (TODS), 7(3):443-469, 1982.

[17] M. Muralikrishna. Optimization and dataflow algorithms for nested tree queries. In Proc. of VLDB, pages 77-85, 1989.

[18] R. L. Rivest, L. M. Adleman, and M. Dertouzos. On Data Banks and Privacy Homomorphisms. In Foundations of Secure Computation, 1978.

[19] D. R. Stinson. Cryptography: Theory and Practice. CRC Press, 1995.

[20] TPC-H. Benchmark Specification, http://www.tpc.org/tech.

9. Summary

This concludes the description of the preferred embodiment of the invention. The following describes some alternative embodiments for accomplishing the present invention. For example, any type of computer, such as a mainframe, minicomputer, or personal computer, could be used with the present invention. In addition, any software program performing database queries with the need for encryption could benefit from the present invention.

In summary, the present invention discloses a client-server relational database system having a client computer connected to a server computer via a network, wherein data from the client computer is encrypted by the client computer and hosted by the server computer, the encrypted data is operated upon by the server computer to produce an intermediate results set, the intermediate results set is sent from the server computer to the client computer where it is operated upon by the client computer and then returned to the server computer where it is further operated upon by the server computer before being sent again from the server computer to the client computer in order to produce actual results.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A client-server relational database system, comprising:
    a client computer;
    a server computer; and
    a network connecting the client computer and the server computer;
    wherein data from the client computer is encrypted by the client computer and hosted by the server computer, the encrypted data is operated upon by the server computer to produce an encrypted intermediate results set, the encrypted intermediate results set is sent from the server computer to the client computer where the encrypted intermediate results set is decrypted and operated upon by the client computer to create an updated intermediate results set, and the updated intermediate results set is then re-encrypted and returned to the server computer where the re-encrypted intermediate results set is further operated upon by the server computer to generate an encrypted new intermediate results set, which is sent from the server computer to the client computer to be decrypted and operated upon by the client computer in order to produce an answer for presentation to a user.

2. The system of claim 1, wherein the operations comprise logical comparison operations.

3. The system of claim 1, wherein the operations comprise filtering operations.

4. The system of claim 1, wherein the operations comprise sorting operations.

5. The system of claim 1, wherein the server computer executes a round-trip filtering operator that specifies when the encrypted intermediate results set is sent from the server computer to the client computer to be operated upon by the client computer and then the re-encrypted intermediate results set is returned to the server computer to be operated upon by the server computer.

6. The system of claim 5, wherein the round-trip filtering operator sends maybe tuples from the server computer to the client computer, the client computer filters out certain tuples from the maybe tuples, and the server computer receives back only certain tuples from the client computer.

7. The system of claim 5, wherein the server receives a query from the client computer, generates a plurality of query execution plans having different placements of the round-trip filtering operator, and chooses one of query execution plans that comprises an optimal placement of the round-trip filtering operator in a query tree.

8. The system of claim 5, wherein the server executes a last-trip decryption operator that specifies when the encrypted new intermediate results set is sent from the server computer to the client computer in order to produce the answer for presentation to the user.

9. The system of claim 8, wherein the server computer receives a query from the client computer, generates a plurality of query execution plans having different placements of the last-trip decryption operator, and chooses one of the query execution plans that comprises an optimal placement of the last-trip decryption operator in a query tree.

10. The system of claim 9, wherein the server computer chooses one of the query execution plans that comprises an optimal placement for the round-trip filtering operators in the query tree and then chooses one of the query execution plans that comprises an optimal placement for the last-trip decryption operator in the query tree.

11. The system of claim 8, wherein the last-trip decryption operator can be pulled up above any unary and binary operator in a query tree, except for a GroupBy operator.

12. The system of claim 11, wherein the GroupBy operator can be pulled above a unary operator other than another GroupBy operator if and only if all columns used in the unary operator are functionally computed by grouping columns of an input relation.

13. The system of claim 12, wherein the GroupBy operator can be pulled above a binary operator if:
    a left-side relation of the GroupBy operator has a key; and
    a predicate of the GroupBy operator does not use a result of the GroupBy operator.

14. A client-server relational database system, comprising:
    a server computer connected to a client computer, wherein data from the client computer is encrypted by the client computer and hosted by the server computer, the encrypted data is operated upon by the server computer to produce an encrypted intermediate results set, the encrypted intermediate results set is sent from the server computer to the client computer where the encrypted intermediate results set is decrypted and operated upon by the client computer to create an updated intermediate results set, and the updated intermediate results set is then re-encrypted and returned to the server computer where the re-encrypted intermediate results set is further operated upon by the server computer to generate an encrypted new intermediate results set, which is sent from the server computer to the client computer to be decrypted and operated upon by the client computer in order to produce an answer for presentation to a user.

15. A method of performing computations on encrypted data stored on a computer system, comprising:
    encrypting data at a client computer;
    hosting the encrypted data on a server computer;
    operating upon the encrypted data at the server computer to produce an intermediate results set;
    transferring the intermediate results set from the server computer to the client computer;
    decrypting the transferred intermediate results set at the client computer;
    operating upon the decrypted intermediate results set at the client computer to generate an updated intermediate results set;
    re-encrypting the updated intermediate results set at the client computer;
    transferring the re-encrypted intermediate results set to the server computer;

operating upon the re-encrypted intermediate results set at the server computer to generate a new intermediate results set;

transferring the new intermediate results set from the server computer to the client computer;

decrypting the transferred new intermediate results set at the client computer; and producing an answer from the decrypted new intermediate results set at the client computer for presentation to a user.

16. The method of claim 15, wherein the operations comprise logical comparison operations.

17. The method of claim 15, wherein the operations comprise filtering operations.

18. The method of claim 15, wherein the operations comprise sorting operations.

19. The method of claim 15, wherein the server computer executes a round-trip filtering operator that specifies when the encrypted intermediate results set is sent from the server computer to the client computer to be operated upon by the client computer and then the re-encrypted intermediate results set is returned to the server computer to be operated upon by the server computer.

20. The method of claim 19, wherein the round-trip filtering operator sends maybe tuples from the server computer to the client computer, the client computer filters out certain tuples from the maybe tuples, and the server computer receives back only certain tuples from the client computer.

21. The method of claim 19, wherein the server receives a query from the client computer, generates a plurality of query execution plans having different placements of the round-trip filtering operator, and chooses one of query execution plans that comprises an optimal placement of the round-trip filtering operator in a query tree.

22. The method of claim 19, wherein the server executes a last-trip decryption operator that specifies when the encrypted new intermediate results set is sent from the server computer to the client computer in order to produce the answer for presentation to the user.

23. The method of claim 22, wherein the server computer receives a query from the client computer, generates a plurality of query execution plans having different placements of the last-trip decryption operator, and chooses one of query execution plans that comprises an optimal placement of the last-trip decryption operator in a query tree.

24. The method of claim 23, wherein the server computer chooses one of the query execution plans that comprises an optimal placement for the round-trip filtering operators in the query tree and then chooses one of the query execution plans that comprises an optimal placement for the last-trip decryption operator in the query tree.

25. The method of claim 22, wherein the last-trip decryption operator can be pulled up above any unary and binary operator in a query tree, except for a GroupBy operator.

26. The method of claim 25, wherein the GroupBy operator can be pulled above a unary operator other than another GroupBy operator if and only if all columns used in the unary operator are functionally computed by grouping columns of an input relation.

27. The method of claim 26, wherein the GroupBy operator can be pulled above a binary operator if:

a left-side relation of the GroupBy operator has a key; and a predicate of the GroupBy operator does not use a result of the GroupBy operator.

28. An article of manufacture comprising a storage device for storing instructions that, when read and executed by one or more computers, result in the computers performing computations on encrypted data stored on a computer system, comprising:

encrypting data at a client computer;

hosting the encrypted data on a server computer;

operating upon the encrypted data at the server computer to produce an intermediate results set;

transferring the intermediate results set from the server computer to the client computer;

decrypting the transferred intermediate results set at the client computer;

operating upon the decrypted intermediate results set at the client computer to generate an updated intermediate results set;

re-encrypting the updated intermediate results set at the client computer;

transferring the re-encrypted intermediate results set to the server computer;

operating upon the re-encrypted intermediate results set at the server computer to generate a new intermediate results set;

transferring the new intermediate results set from the server computer to the client computer;

decrypting the transferred new intermediate results set at the client computer; and producing an answer from the decrypted new intermediate results set at the client computer for presentation to a user.

29. The article of claim 28, wherein the operations comprise logical comparison operations.

30. The article of claim 28, wherein the operations comprise filtering operations.

31. The article of claim 28, wherein the operations comprise sorting operations.

32. The article of claim 28, wherein the server computer executes a round-trip filtering operator that specifies when the encrypted intermediate results set is sent from the server computer to the client computer to be operated upon by the client computer and then the re-encrypted intermediate results set is returned to the server computer to be operated upon by the server computer.

33. The article of claim 32, wherein the round-trip filtering operator sends maybe tuples from the server computer to the client computer, the client computer filters out certain tuples from the maybe tuples, and the server computer receives back only certain tuples from the client computer.

34. The article of claim 32, wherein the server receives a query from the client computer, generates a plurality of query execution plans having different placements of the round-trip filtering operator, and chooses one of query execution plans that comprises an optimal placement of the round-trip filtering operator in a query tree.

35. The article of claim 32, wherein the server executes a last-trip decryption operator that specifies when the encrypted new intermediate results set is sent from the server computer to the client computer in order to produce the answer for presentation to the user.

36. The article of claim 35, wherein the server computer receives a query from the client computer, generates a plurality of query execution plans having different placements of the last-trip decryption operator, and chooses one of the query execution plans that comprises an optimal placement of the last-trip decryption operator in a query tree.

37. The article of claim 36, wherein the server computer chooses one of the query execution plans that comprises an optimal placement for the round-trip filtering operators in the query tree and then chooses one of the query execution plans that comprises an optimal placement for the last-trip decryption operator in the query tree.

38. The article of claim 35, wherein the last-trip decryption operator can be pulled up above any unary and binary operator in a query tree, except for a GroupBy operator.

39. The article of claim 38, wherein the GroupBy operator can be pulled above a unary operator other than another GroupBy operator if and only if all columns used in the unary operator are functionally computed by grouping columns of an input relation.

40. The article of claim 39, wherein the GroupBy operator can be pulled above a binary operator if:
 a left-side relation of the GroupBy operator has a key; and
 a predicate of the GroupBy operator does not use a result of the GroupBy operator.

* * * * *